United States Patent [19]

Gruber et al.

[11] Patent Number: 4,609,572

[45] Date of Patent: Sep. 2, 1986

[54] PROCESS FOR THE PRODUCTION OF CHEMICALLY RESISTANT COATINGS

[75] Inventors: Hermann Gruber, Leverkusen; Alois Fehlbier, Burscheid, both of Fed. Rep. of Germany

[73] Assignee: Bayer Aktiengesellschaft, Leverkusen, Fed. Rep. of Germany

[21] Appl. No.: 719,782

[22] Filed: Apr. 4, 1985

[30] Foreign Application Priority Data

Apr. 19, 1984 [DE] Fed. Rep. of Germany ....... 3414807

[51] Int. Cl.$^4$ .............................................. B05D 3/02
[52] U.S. Cl. ................... 427/385.5; 427/140; 427/207.1; 427/208.2; 427/388.2; 427/388.3; 427/388.4; 427/393.6
[58] Field of Search ............... 427/385.5, 393.6, 388.2, 427/388.3, 388.4, 208.2, 207.1, 140; 524/4, 2, 3, 507, 425

[56] References Cited

U.S. PATENT DOCUMENTS

| | | |
|---|---|---|
| 2,902,388 | 9/1959 | Szukiewicz ..................... 427/393.6 |
| 3,505,275 | 4/1970 | Sato et al. ............................ 260/37 |
| 3,546,148 | 12/1970 | Diamond et al. ............ 427/393.6 X |
| 3,763,060 | 10/1973 | Hamerstrand et al. ................. 260/9 |
| 3,790,518 | 2/1974 | Shearing et al. ...................... 260/25 |
| 4,211,680 | 7/1980 | Shearing ..................... 260/29.2 TN |
| 4,268,554 | 5/1981 | Gras ...................................... 428/35 |

FOREIGN PATENT DOCUMENTS

| | | |
|---|---|---|
| 1170627 | 12/1964 | Fed. Rep. of Germany . |
| 1192864 | 5/1970 | United Kingdom . |
| 1331781 | 9/1973 | United Kingdom . |
| 1333263 | 10/1973 | United Kingdom . |
| 1348381 | 3/1974 | United Kingdom . |
| 1373214 | 11/1974 | United Kingdom . |
| 1413121 | 11/1975 | United Kingdom . |

*Primary Examiner*—Thurman K. Page
*Attorney, Agent, or Firm*—Gene Harsh; Joseph C. Gil; Thomas W. Roy

[57] ABSTRACT

The present invention is directed to a process for applying a chemically resistant coating to a substrate which entails coating a substrate with a composition containing (a) a liquid polyisocyanate component which is present in an amount sufficient to provide an isocyanate index for said composition of at least 30, (b) a polyol component containing at least one organic polyhydroxyl compound having an alcoholic hydroxyl group content of about 0.5 to 15% by weight, (c) water in a quantity of from 20 to 60% by weight, based on the weight of component (b), (d) glycerine in a quantity of about 40 to 200% by weight, based on the weight of component (b), and (e) at least one alkaline earth metal hydroxide or oxide in a quantity of about 50 to 1000% by weight, based on the weight of the glycerine.

16 Claims, No Drawings

PROCESS FOR THE PRODUCTION OF CHEMICALLY RESISTANT COATINGS

BACKGROUND OF THE INVENTION

1. Field of the Invention

The present invention relates to a new process for the production of chemically resistant coatings using a coating agent based on organic polyisocyanates, organic compounds having alcoholic hydroxyl groups and water, the coating agent additionally containing combinations of glycerine and hydroxides or oxides of alkaline earth metals to prolong the processing time and improve the chemical resistance thereof.

2. Description of the Prior Art

The use of hydroxides or oxides of alkaline earth metals in the production of unfoamed polyurethane plastics using water-containing reactive systems based on organic polyisocyanates and organic compounds having isocyanate-reactive groups is already known. DE-PS No. 1,170,627, for example, describes the effect of calcium oxide as a dehydrating agent in polyurethane systems. GB-PS 1,147,695 describes, among other things, the use of calcium hydroxide in water-containing reactive systems of this type in the production of unfoamed polyurethane plastics. Furthermore, hydraulic cements were used to prevent foaming in water-containing polyurethane systems (c.f., by way of example, DE-OS Nos. 2,113,046, 2,254,251, 2,113,042, 2,300,206 or DE-AS Nos. 1,924,468). Whereas the mechanical properties and the chemical resistance of the coatings produced according to these prior publications were completely satisfactory, the problem of a sufficient processing time has hitherto not been satisfactorily solved.

Coating compositions of this type have to have a processing time of at least 30 minutes to facilitate expert processing.

Thus an object of the present invention was to improve the known processes for the production of chemically resistant plastics, more particularly surface coatings based on water and inorganic filler-containing polyurethane systems, such that the coating agents which are used have a sufficient processing time and enable coatings to be produced which are at least equal to corresponding systems of prior art from the point of view of the chemical resistance and other properties thereof.

This object is achieved by the present process which is described in more detail in the following.

SUMMARY OF THE INVENTION

The present invention is directed to a process for applying a chemically resistant coating to a substrate which entails coating a substrate with a composition containing (a) a liquid polyisocyanate component which is present in an amount sufficient to provide an isocyanate index for said composition of at least 30, (b) a polyol component containing at least one organic polyhydroxyl compound having an alcoholic hydroxyl group content of about 0.5 to 15% by weight, (c) water in a quantity of from 20 to 60% by weight, based on the weight of component (b), (d) glycerine in a quantity of about 40 to 200% by weight, based on the weight of component (b), and (e) at least one alkaline earth metal hydroxide or oxide in a quantity of about 50 to 1000% by weight, based on the weight of the glycerine.

DETAILED DESCRIPTION OF THE INVENTION

The fact that the present object could be attained by the present process is surprising in two ways. The coating compositions or agents which are used according to the present invention contain, as before, hydroxides or oxides of alkaline earth metals, more particularly calcium hydroxide, that is basic compounds which are known to have a strong accelerating effect on the isocyanate addition reaction. Furthermore, glycerine is a compound which is known to be very reactive with respect to polyisocyanates. However, the simultaneous use of glycerine, as opposed to suitable comparable mixtures without glycerine, more than doubles the processing time.

Any organic polyisocyanates which are liquid at room temperature may be used as polyisocyanate component (a) in accordance with the present invention. Examples include the liquid polyisocyanates based on diisocyanatodiphenylmethane such as liquid mixtures of 4,4'-diisocyanatodiphenylmethane and 2,4'-diisocyanatodiphenylmethane, liquid derivatives of 4,4'-diisocyanatodiphenylmethane and optionally 2,4'-diisocyanatodiphenylmethane (i.e. the reaction products thereof with subequivalent quantities of polyhydric alcohols, more particularly with polypropylene glycols having a molecular weight of up to 700) and the carbodiimide-modified derivatives of these diisocyanates. Additional examples include tris-(isocyanatohexyl)-isocyanurate or mixtures with the higher homologues thereof, tris-(isocyanatohexyl)-biuret or mixtures with the higher homologues thereof and liquid low molecular weight NCO-prepolymers based on 2,4- and/or 2,6-diisocyanatotoluene. However, polyisocyanate mixtures of the diphenylmethane series which are obtained by phosgenating aniline/formaldehyde condensates are preferably used as polyisocyanate component (a). Any mixtures of the polyisocyanates mentioned above by way of example may of course also be used. Polyisocyanate component (a) is used in a quantity corresponding to an isocyanate index of at least 30, preferably of about 40 to 180, most preferably of about 60 to 120. The Term "isocyanate index" is to be understood, in this instance, as designating the number of isocyanate groups per 100 isocyanate-reactive groups, water being the only inorganic compound included in the calculation. Water is considered a difunctional compound in this respect.

Polyol component (b) includes organic compounds having at least two hydroxyl groups and a hydroxyl group content of about 0.5 to 15%, preferably about 3 to 10% by weight or mixtures of compounds of this type. Examples include polyester polyols which are known from polyurethane chemistry and have a molecular weight of about 500 to 5000 and preferably about 600 to 2000, known polyether polyols having the same molecular weight range, hydroxyl group-containing polycarbonates having the same molecular weight range, hydroxyl group-containing ketone or aldehyde resins having the above hydroxyl group content, hydroxyl group-containing polymers and natural materials having the above hydroxyl group content. Liquid polyols containing a proportion of fatty acid such as castor oil, mixtures of ketone resins and castor oil or concentration products of ketone resins with castor oil, as described in DE-OS 1,720,710, are particularly suitable.

Component (c) is water and is used in a quantity of about 20 to 60% by weight, preferably about 30 to 50% by weight, based on the weight of component (b).

In addition to the glycerine which is essential to the invention and is used in a quantity of about 40 to 200% by weight, preferably about 70 to 130% by weight, based on the weight of component (b), the following may also be used as organic auxiliaries and additives (d):

plastics powders, such as homopolymers or mixed polymers of vinyl chloride, more particularly pulverized polyvinylchloride. These plastics powders may be used in a quantity of up to about 100, preferably up to about 50% by weight, based on the weight of component (b), plasticizing oils such as alkane sulphonic acid phenyl esters, produced by sulphochlorinating alkanes or alkane mixtures having from 10 to 18 carbon atoms and subsequently esterifying with phenol, dibutylphthalate or tributylphosphate or other plasticizing oils used in prior art, for example in the production of plasticized polyvinylchloride. These plasticizing oils are organic auxiliaries and additives which are particularly preferred and may be used in a quantity of up to about 150% by weight, preferably about 50 to 140% by weight, based on the weight of component (b).

bituminous materials such as bitumen oils or petroleum bitumina, which are optionally used dissolved in the plasticizer. These bituminous materials can be used in a quantity of up to about 400% by weight, preferably up to about 300% by weight, based on the weight of component (b).

paraffin oils, which may be used in a quantity of up to 50% by weight, based on the weight of component (b).

emulsifiers, preferably non-ionic emulsifiers, such as commercial ethoxylation products of alkyl phenols, more particularly of iso-nonylphenol which may be used in a quantity of up to about 20%, preferably up to about 15% by weight, based on component (b).

anti-foaming agents of the conventional type which may be used in small quantities.

Inorganic auxiliaries and additives (e) are the hydroxides or oxides of alkaline earth metals which are essential to the present invention and optionally in addition other inorganic auxiliaries and additives.

Suitable hydroxides or oxides of alkaline earth metals are particularly magnesium oxide, magnesium hydroxide, calcium oxide or calcium hydroxide. Calcium hydroxide is most particularly preferred. These hydroxides or oxides are used in a quantity of about 50 to 1000% by weight, preferably about 100 to 500% by weight, based on the weight of the glycerine.

The other inorganic auxiliaries and additives which may optionally be used are mineral additives such as sand, finely-grained gravel, barium sulphate and/or calcium carbonate, inorganic pigments, carbon black or graphite. Even small quantities of the two last-mentioned additives produce coatings having less than the resistance value of $10^6\Omega$, necessary for electrically conductive coatings. The above mineral fillers may also be used in a quantity of up to about 40 times the weight of component (b). Large amounts of mineral fillers are also used, particularly in the production of thick coatings (up to a 5 cm layer thickness). Mineral fillers of this type are not generally used in the production of sealers and primers.

In principle, the individual components, mentioned by way of example, for the production of the present coating compositions can be mixed with each other in any order. However, the isocyanate group-free organic components and the water, optionally with the simultaneous use of an emulsifier, are preferably first combined to produce an emulsion-like aqueous-organic mixture and this is then mixed with polyisocyanate component (a) and the inorganic auxiliaries and additives. The coating compositions which are used according to the present invention have a processing time of at least 50 minutes. They can be processed in the usual manner, for example using rollers or spatula devices and are stressed after about 24 hours by slight movement. In comparison with conventional solvent-free polyurethane coatings, it is an important advantage that water containing substrates, such as moist concrete surfaces can be easily coated. The coatings which have hardened to completion have excellent chemical resistance. Of particular note is the good resistance to mineral and organic acids, alkalis and solvents. The coatings which have hardened to completion are, moreover, mechanically highly chargeable. The mechanical resistance to operational stresses is maintained even in cleansing operations with steam. Conventional floor coverings have marked thermoplasticity in conjunction with poor resistance under these conditions.

The present process for the production of coatings is suitable for the production of sealers and primers for any substrates, more particularly for mineral backings (concrete, among others), steel surfaces or ceramic plates in the production of thick-layered coatings, floor coverings or for the production of joining layers for laying ceramic plates.

By this method, ceramic plates may be completely coated with the coating composition used according to the present invention and then laid, the good adhesion being crucial. After the joints have sealed, composite structures are obtained which are particularly suitable in acid proof installations for high stresses by chemicals. A further advantage of the coating agents which are used according to the present invention is the fact that the devices used for the processing thereof may be cleaned with water, without using solvent, as long as the reaction of the components is not too far advanced.

The following Examples serve to further explain the process according to the present invention. All parts and percentages are based on weight unless otherwise specified.

EXAMPLES

Example 1

(a) 260 parts of a phenyl ester of a commercial $C_{12}$–$C_{18}$ alkane sulphonic acid (plasticizer) were placed in a mixing chamber. 100 parts of a pulverulous PVC-homopolymer (K-value 76) were dispersed using a dissolver at 23° C. and at a mixing speed of 3000 rpm over a period of 10 min. 260 parts of the concentration product of a cyclohexanone-formaldehyde condensate with castor oil according to Example 1 of DE-OS 1,720,710, 50 parts of a 25% aqueous solution of a commercial emulsifier (ethoxylated isononylphenol, MARLOPHEN emulsifier by Chemische Werke Hüls AG) and 10 parts of a commercial anti-foaming agent (BEVALOID agent by Bevaloid Ltd., England) were added with further stirring. At a rotation speed of 3000 rpm the mixture was further stirred for 5 minutes. Then 60 parts of water were stirred in and, after a further stirring time of 5 minutes, 260 parts of 1,2,3-propanetriol (glycerine) were added with continued stirring. After a stirring time of 5 minutes under the same conditions an emulsion having a viscosity of 1500 mPa.s/23° C. was obtained which was stable in storage.

(b) 100 parts of the emulsion produced according to 1(a) were mixed with 140 parts of a polyisocyanate mixture of the diphenylmethane series having an NCO-content of 31% and a viscosity of 120 mPa.s/23° C. A filler mixture containing 500 parts of quartz sand having a grain size of from 0.1 to 0.2 mm, 1000 parts of quartz sand having a grain size of from 0.8 to 1.2 mm, and 80 parts of calcium hydroxide was homogeneously mixed into the resulting two-component binder mixture.

The finished mixture had a mortar-like consistency and was applied to concrete surfaces using a smoothing trowel which had previously been treated with a primer of the same binder as was used for the synthetic resin mortar (layer thickness: about 3 cm).

The processing time of the mortar was about 50 minutes at 23° C. The synthetic resin mortar easily hardened to completion, was homogeneous and had the following mechanical properties measured according to DIN 1164:

Compression strength 55 N/mm$^2$
Tensile strength 15 N/mm$^2$

The coating could be walked on after 15 hours and was fully stressable after 3 days.

Coatings according to 1(b) have excellent resistance to most inorganic and organic acids and alkalis. They also have excellent resistance to solvent.

EXAMPLE 2 (Comparative test)

Example 1 was repeated with the exception that 1,2,3-propanetriol was not added. The viscosity of the emulsion was 1300 mPa.s/23° C.

After the polyisocyanate and the filler mixture from Example 1(b) had been added, a processing time of 15 minutes at 23° C. was obtained, compared with 50 minutes in the case of the composition according to Example 1. Tests according to DIN 1164 produce the following values:

Compression strength 30 N/mm$^2$
Tensile strength 10 N/mm$^2$

EXAMPLE 3 (Comparative test)

In a comparative test, Example 1(a) was repeated, with the difference that the following polyols were used instead of 1,2,3-propanetriol:

(a) 1,2,6-hexanetriol (260 parts)
(b) ethylene glycol (260 parts)
(c) trimethyl-1,6-hexanediol (260 parts)

The mixtures which resulted after addition of the polyisocyanate according to 1(b) to the individual emulsions were not suitable for the production of polyurethane coatings as they were not stable in storage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for applying a chemically resistant coating to a substrate which comprises coating a substrate with a composition comprising (a) a liquid polyisocyanate component which is present in an amount sufficient to provide an isocyanate index for said composition of at least 30,
   (b) a polyol component containing at least one organic polyhydroxyl compound having a hydroxyl group content of about 0.5 to 15% by weight,
   (c) water in a quantity of about 20 to 60% by weight, based on the weight of component (b),
   (d) glycerine in a quantity of about 40 to 200% by weight, based on the weight of component (b) and
   (e) at least one alkaline earth metal hydroxide or oxide in a quantity of about 50 to 1000% by weight, based on the weight of glycerine.

2. The process of claim 1 wherein the polyisocyanate component (a) is used in a quantity sufficient to provide an isocyanate index of about 40 to 180.

3. The process of claim 1 wherein a polyisocyanate mixture obtained by phosgenating aniline/formaldehyde condensates is used as polyisocyanate component (a).

4. The process of claim 2 wherein a polyisocyanate mixture obtained by phosgenating aniline/formaldehyde condensates is used as polyisocyanate component (a).

5. The process according to claim 1 wherein said composition additionally comprises a member selected from the group consisting of polyvinylchloride, organic plasticizers, emulsifiers and bituminous materials.

6. The process according to claim 2 wherein said composition additionally comprises a member selected from the group consisting of polyvinylchloride, organic plasticizers, emulsifiers and bituminous materials.

7. The process according to claim 3 wherein said composition additionally comprises a member selected from the group consisting of polyvinylchloride, organic plasticizers, emulsifiers and bituminous materials.

8. The process according to claim 4 wherein said composition additionally comprises a member selected from the group consisting of polyvinylchloride, organic plasticizers, emulsifiers and bituminous materials.

9. The process according to claim 1 wherein said composition additionally comprises a member selected from the group consisting of sand, silica, pigments, carbon black and graphite.

10. The process according to claim 2 wherein said composition additionally comprises a member selected from the group consisting of sand, silica, pigments, carbon black and graphite.

11. The process according to claim 3 wherein said composition additionally comprises a member selected from the group consisting of sand, silica, pigments, carbon black and graphite.

12. The process according to claim 4 wherein said composition additionally comprises a member selected from the group consisting of sand, silica, pigments, carbon black and graphite.

13. The process according to claim 5 wherein said composition additionally comprises a member selected from the group consisting of sand, silica, pigments, carbon black and graphite.

14. The process according to claim 6 wherein said composition additionally comprises a member selected from the group consisting of sand, silica, pigments, carbon black and graphite.

15. The process according to claim 7 wherein said composition additionally comprises a member selected from the group consisting of sand, silica, pigments, carbon black and graphite.

16. The process according to claim 8 wherein said composition additionally comprises a member selected from the group consisting of sand, silica, pigments, carbon black and graphite.

* * * * *